United States Patent
Fowles et al.

(12)

(10) Patent No.: US 10,527,217 B2
(45) Date of Patent: Jan. 7, 2020

(54) LAUNCH SYSTEM FOR UNDERGROUND GAS MAIN STOP-OFF STATION

(71) Applicant: Consolidated Edison Company of New York, Inc., New York, NY (US)

(72) Inventors: Philip J. Fowles, North Merrick, NY (US); Joseph Mandara, Middletown, NY (US); Dennis R. Jarnecke, River Forest, IL (US); Jeff W. Mainzer, Cary, IL (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 40 days.

(21) Appl. No.: 15/901,001

(22) Filed: Feb. 21, 2018

(65) Prior Publication Data

US 2019/0257463 A1 Aug. 22, 2019

(51) Int. Cl.
*F16L 55/124* (2006.01)
*F17D 5/00* (2006.01)

(52) U.S. Cl.
CPC ............ *F16L 55/124* (2013.01); *F17D 5/005* (2013.01)

(58) Field of Classification Search
CPC .............................. F16L 55/124; F17D 5/005
USPC .......................................................... 138/92
See application file for complete search history.

(56) References Cited

U.S. PATENT DOCUMENTS

| 1,946,138 | A | * | 2/1934 | Gardner | F16K 7/10 138/93 |
| 3,842,864 | A | * | 10/1974 | Riegel | F16K 7/10 138/93 |
| 4,246,712 | A | * | 1/1981 | Vander Wall | G09F 3/14 40/316 |
| 4,458,721 | A | * | 7/1984 | Yie | F16K 7/10 137/318 |
| 4,832,069 | A | * | 5/1989 | Gale | B29C 65/7802 137/15.13 |
| 5,462,077 | A | * | 10/1995 | Cohen | F16K 7/10 137/15.08 |
| 5,590,676 | A | * | 1/1997 | Wagner | F16L 55/124 137/15.18 |
| 8,172,482 | B2 | * | 5/2012 | Kiest, Jr. | E03F 3/04 138/97 |
| 8,800,601 | B2 | * | 8/2014 | Mainzer | F16L 55/46 137/15.08 |
| 9,638,347 | B2 | * | 5/2017 | Yamamoto | F16K 7/10 |
| 2010/0236639 | A1 | * | 9/2010 | Penza | F16L 41/06 137/15.15 |
| 2013/0048130 | A1 | * | 2/2013 | Lundman | F16L 55/124 138/93 |

* cited by examiner

*Primary Examiner* — Craig M Schneider
*Assistant Examiner* — David R Deal
(74) *Attorney, Agent, or Firm* — Cantor Colburn LLP

(57) ABSTRACT

An in situ launch system for an underground gas main stop-off station includes: an outer launch tube having a distal lower end and a proximal upper end; a transition fitting having a proximal end fitted to the distal end of the outer launch tube with a gas tight seal, and a distal end; the distal end of the transition fitting having external threads having a first nominal dimension, and internal threads having a second nominal dimension; and a completion plug threaded into the internal threads of the transition fitting.

19 Claims, 6 Drawing Sheets

LAUNCH SYSTEM FOR UNDERGROUND GAS MAIN STOP-OFF STATION

BACKGROUND OF THE INVENTION

The present disclosure relates generally to an underground gas main stop-off system, and particularly to an in situ launch system for an underground gas main stop-off system.

Underground gas mains are typically part of a low pressure (¼ PSI, for example) distribution system, and on occasion require access by gas company personnel to the underground gas main pipe for emergency or maintenance situations. An existing method of stopping-off gas flow in a low pressure cast iron or steel gas main requires a field crew to make an excavation to expose the main pipe, tap the main pipe and install a stopper. This procedure is expensive, disruptive to the environment and general public, and very time consuming when considering that a quick shut down is of utmost importance during an emergency or maintenance situation.

While existing means for stopping-off gas flow in an emergency or maintenance situation may be suitable for their intended purpose, the art relating to stopping-off gas flow in a low pressure gas main would be advanced with a gas main stop-off system that does not require excavation to expose the gas main pipe.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment includes an in situ launch system for an underground gas main stop-off station, the launch system having: an outer launch tube having a distal lower end and a proximal upper end; a transition fitting having a proximal end fitted to the distal end of the outer launch tube with a gas tight seal, and a distal end; the distal end of the transition fitting having external threads having a first nominal dimension, and internal threads having a second nominal dimension; and a completion plug threaded into the internal threads of the transition fitting.

Another embodiment includes a method of employing the aforementioned in situ launch system, the launch system being threaded to the underground gas main via the external threads of the transition fitting, the method including: unthreading and removing the completion plug from the transition fitting and from the outer launch tube absent a need to excavate to reach the underground gas main.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Figure 1:
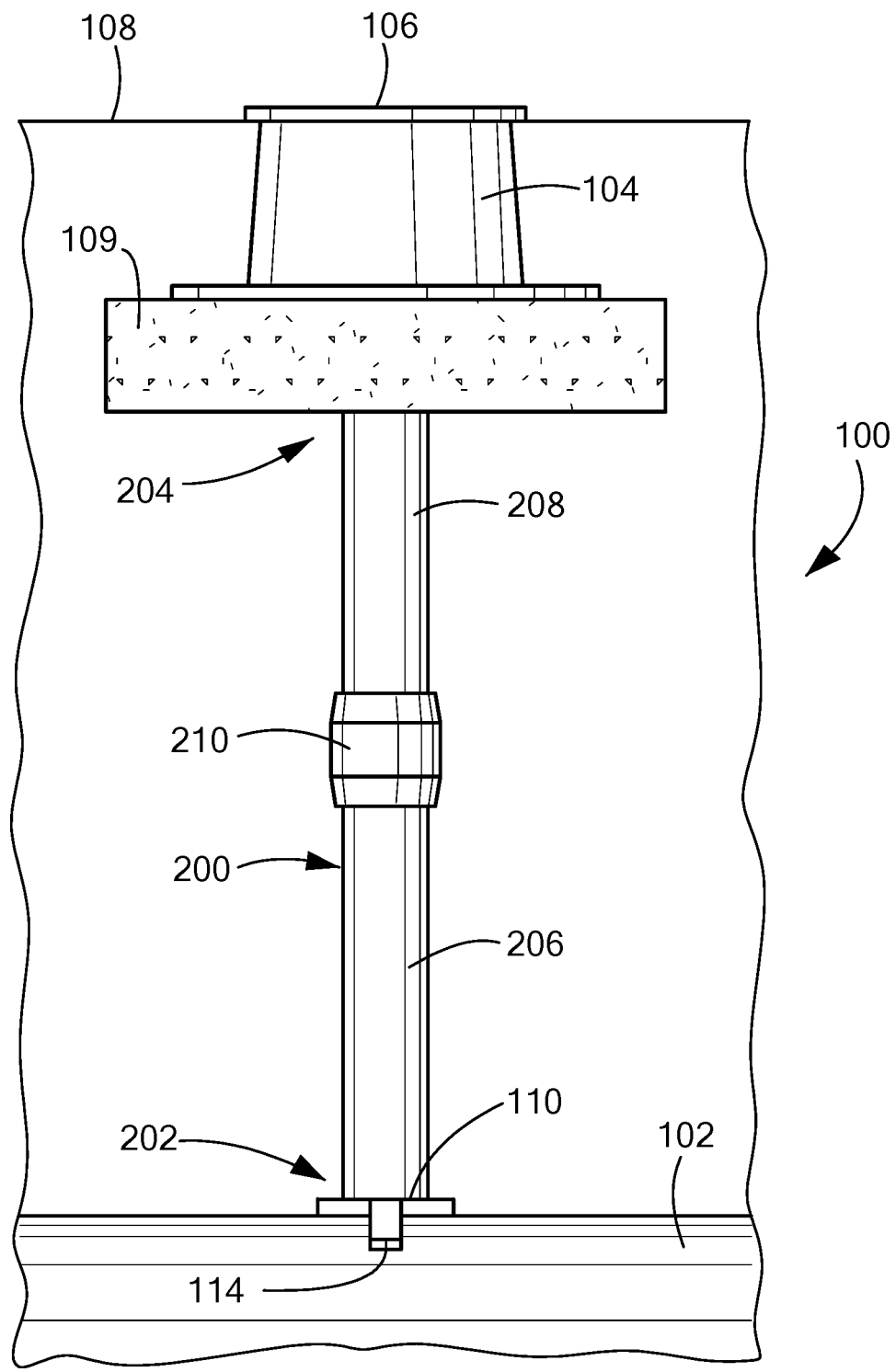
FIG. 1 depicts a side view of an in situ launch system for an underground gas main stop-off station, in accordance with an embodiment.

Although the following detailed description contains many specifics for the purposes of illustration, anyone of ordinary skill in the art will appreciate that many variations and alterations to the following details are within the scope of the claims. Accordingly, the following example embodiments are set forth without any loss of generality to, and without imposing limitations upon, the claimed invention.

An embodiment, as shown and described by the various figures and accompanying text, provides an in situ Low Pressure Main Stop-off System (LPMSOS) (also herein referred to as an in situ launch system for an underground gas main stop-off station) that will allow gas field crews to quickly deploy special balloon stoppers into large diameter (16" to 36", for example) low pressure metallic gas mains, all no-blow, to quickly stop-off gas flow and isolate sections of the gas distribution system without having to excavate and tap the main in order to deploy the balloon stoppers during an emergency situation. While an embodiment is disclosed herein with reference to an inflatable balloon stopper as a means for shutting off gas flow in a gas main, it will be appreciated that the phrase "balloon stopper" is a recognized term of art in the field, which could more generally be described as a gas expansion bag. As such, any and all variations of the phrase "balloon stopper" having construction suitable for a purpose disclosed herein are contemplated and considered to fall within the ambit of the claims provided herewith. Without imposing any limitation on the appended claims, an example LPMSOS consists of a 4" diameter outer launch tube made of polyethylene pipe that is permanently installed onto a steel or cast iron gas main with a unique transition fitting. The outer launch tube is field fabricated to an appropriate length based on the depth of the main, and has upper and lower portions that are connected together using a 4" electrofusion coupling. A 3" diameter screw-on completion plug with an O-ring seal fits inside the transition fitting and acts as a permanent gas seal. The top of the outer launch tube is capped with a quick-connect fitting (such as a 4 inch camlock cap, for example) and is accessible from the street surface through a valve box. Field crews responding to an emergency situation can install directional balloon stoppers by accessing the top of the outer launch tube, installing a slide valve and working through no-blow stuffing boxes to remove the 3" completion plug and install a 3" diameter inner launch tube into the 4" outer launch tube. For 16", 20" and 24" diameter steel or cast iron mains, two stoppers can be installed into the main (one in each direction of the gas main pipe) from a single 3" inner launch tube. For 30" and 36" metallic mains, one stopper may be deployed from a single 3" inner launch tube. Once deployed into the main, the balloon stoppers are pressurized with air to create the flow stop barrier. When the emergency or maintenance situation is over, the balloon stoppers are deflated and removed from the main by retracting them back into the inner launch tube. The inner launch tube is then removed from the 4" outer launch tube and the 3" completion plug is re-installed into the transition fitting, all done no-blow working through the slide valve and no-blow stuffing boxes. Having the ability to quickly isolate sections of the gas distribution system is desirable of Gas Operations, and since large diameter low pressure metallic mains do not contain operable valves, an LPMSOS as disclosed herein will help satisfy the need to provide the ability to quickly access a gas main for balloon stopper deployment and gas flow stoppage. While an embodiment described herein may refer to a no-blow operation, it will be appreciated that this is merely one example and advantage of an invention disclosed herein, and is not intended to be a limitation of any invention disclosed herein.

FIG. 1 depicts an in situ launch system 100 for an underground gas main stop-off station. In an embodiment, the launch system 100 includes an outer launch tube 200 having a distal lower end 202 and a proximal upper end 204. The distal end 202 is securely connected, via a threaded arrangement, to a gas main 102, and the proximal end 204 is disposed within an access box 104 having a cover 106 that is disposed at a street level 108 relative to the underground gas main 102 and in an embodiment may be mounted on a concrete pad 109, all of which is described in more detail below. The access box 104 is disposed proximate to and is configured to provide user access to the proximal end 204 of the outer launch tube 200. In an embodiment, the outer launch tube 200 has a lower portion 206, an upper portion 208, and a coupling 210 disposed therebetween. The lower portion 206 includes the distal lower end 202 of the outer launch tube 200, the upper portion 208 includes the proximal upper end 204 of the outer launch tube 200, and the coupling 210 is configured to provide a gas tight seal between the lower and upper portions 206, 208 at the coupling 210. In an embodiment, the lower and upper portions 206, 208 of the outer launch tube 200, and the coupling 210, are fabricated from a plastic material, and the coupling 210 is electrofusion bonded to the lower and upper portions 206, 208 to provide the gas tight seal. In a first state and prior to a final installation, the coupling 210 is not fused to the lower portion 206 or the upper portion 208, and in a second state at a final installation, the coupling 210 is fused to both the lower portion 206 and the upper portion 208.

Figure 2A:
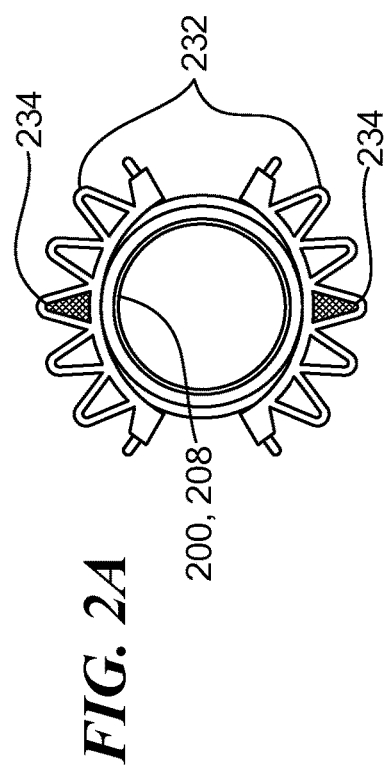
FIG. 2A depicts a top-down view of the proximal end of the outer launch tube depicted in FIG. 2, in accordance with an embodiment.
Figure 2:
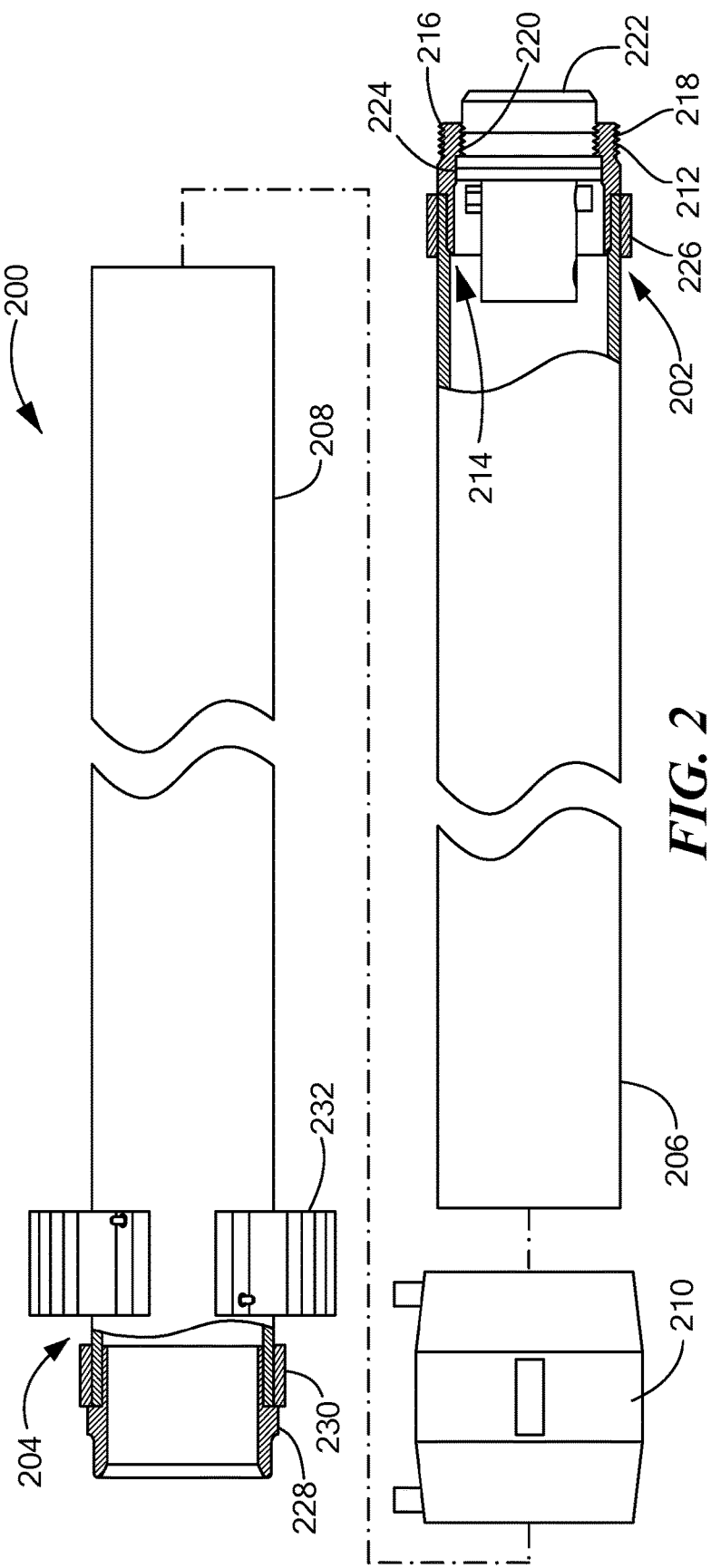
FIG. 2 depicts a disassembled assembly view of a portion of FIG. 1 in more detail, in accordance with an embodiment.

FIG. 2 depicts a portion of FIG. 1 in more detail, such as a transition fitting 212 having a proximal end 214 fitted to the distal end 202 of the outer launch tube 200 (more specifically to the distal end of the lower portion 206) with a gas tight seal formed therebetween, and a distal end 216 having external threads 218 having a first nominal dimension and internal threads 220 having a second nominal dimension. A completion plug 222, which may be of a type known in the art, is threaded into the internal threads 220 of the transition fitting 212, and an O-ring 224 is disposed between an outer diameter of the completion plug 222 and an inner diameter of the transition fitting 212 proximate the distal end 202 of the outer launch tube 200. A compression ring 226 is disposed around an outer diameter of the outer launch tube 200 at the distal end 202 of the outer launch tube 200, where the compression ring 226 is configured to radially bias the distal end 202 of the outer launch tube 200 against the transition fitting 212, and where the distal end 202 of the outer launch tube 200 and the transition fitting 212 are in press-fit relationship with each other. In an embodiment, the transition fitting 212 and the compression ring 226 are fabricated from a metal, the first nominal dimension of the external threads 218 is 4 inches, and the second nominal dimension of the internal threads 220 is 3 inches.

FIG. 2 further depicts an upper adapter 228 fitted to the proximal end 204 of the outer launch tube 200 (more specifically to the proximal end of the upper portion 208) with a gas tight seal formed therebetween. A compression ring 230 is disposed around an outer diameter of the outer launch tube 200 at the proximal end 204 of the outer launch tube 200, where the compression ring 230 is configured to radially bias the proximal end 204 of the outer launch tube 200 against the upper adapter 228, and where the outer launch tube 200 and the upper adapter 228 are in press-fit relationship with each other. In an embodiment, a flexible restraint 232 is disposed toward the proximal end 204 of the outer launch tube 200 proximate the upper adapter 228, where the flexible restraint 232 is fabricated from a plastic material and is bonded to the outer launch tube 200 via electrofusion for example, and where the flexible restraint 232 is disposed around a substantial outer circumference of the outer launch tube 200 (best seen with reference to FIG. 2A). In an embodiment, the proximal upper end 204 of the outer launch tube 200 further comprises markings 234, such as markings 234 on opposing sides of the flexible restraint 232 (see FIG. 2A), that are disposed to identify an upstream and a downstream orientation of the gas main 102, which would be hidden in a back-filled installation. In an embodiment, the upper adapter 228 and the compression ring 230 are fabricated from a metal.

Figure 3A:
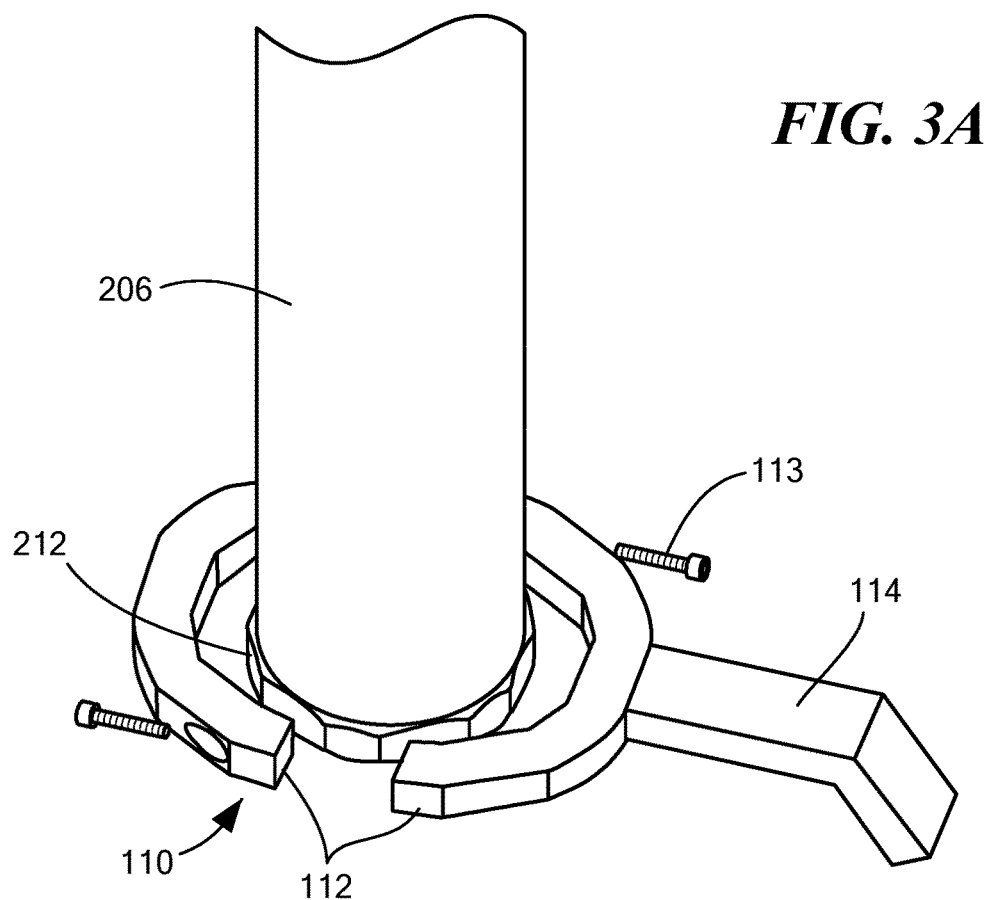
FIG. 3A depicts a rotated isometric view of another portion of FIG. 1 in more detail, in accordance with an embodiment.
Figure 3B:
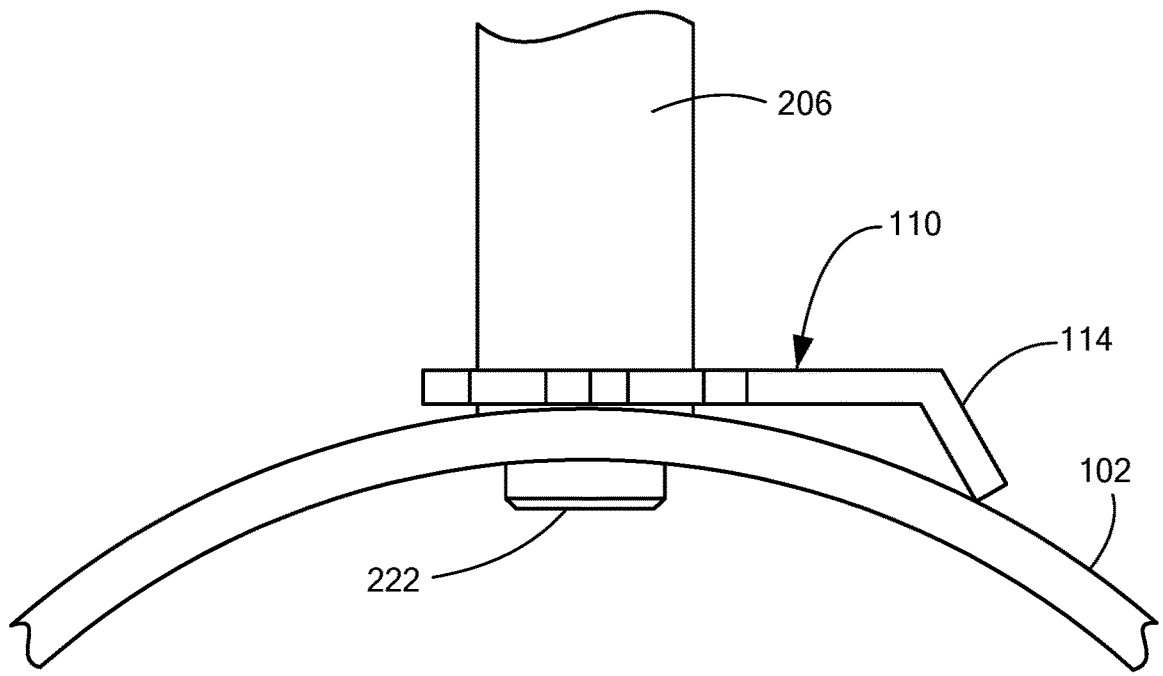
FIG. 3B depicts a side view of the portion of FIG. 3A, in accordance with an embodiment.

With reference back to FIG. 1 in combination with FIGS. 2, 3A and 3B, an embodiment includes an anti-rotation device 110 that is securely disposed at the distal end 202 of the outer launch tube 200 proximate the transition fitting 212. The anti-rotation device 110 has a first portion 112 that is separable so that it can be fitted around the top of the transition fitting 212 and be tightly secured thereto via bolts 113 or other suitable means to form a compression clamp type fit, and a second portion 114 that extends downward with respect to the distal end 202 of the outer launch tube 200 and is configured to engage with an outer surface of the gas main 102 (best seen with reference to FIGS. 1, 3A and 3B). Flat surface areas on both the transition fitting 212 and the first portion 112 of the anti-rotation device 110 provide face-to-face engagement of the two engaging components to facilitate the anti-rotation function. The downward extending second portion 114 is configured to resist rotation of the outer launch tube 200 in an event where the launch system 100 is connected to the gas main 102 and the completion plug 222 is rotatably removed from the transition fitting 212.

Figure 4:
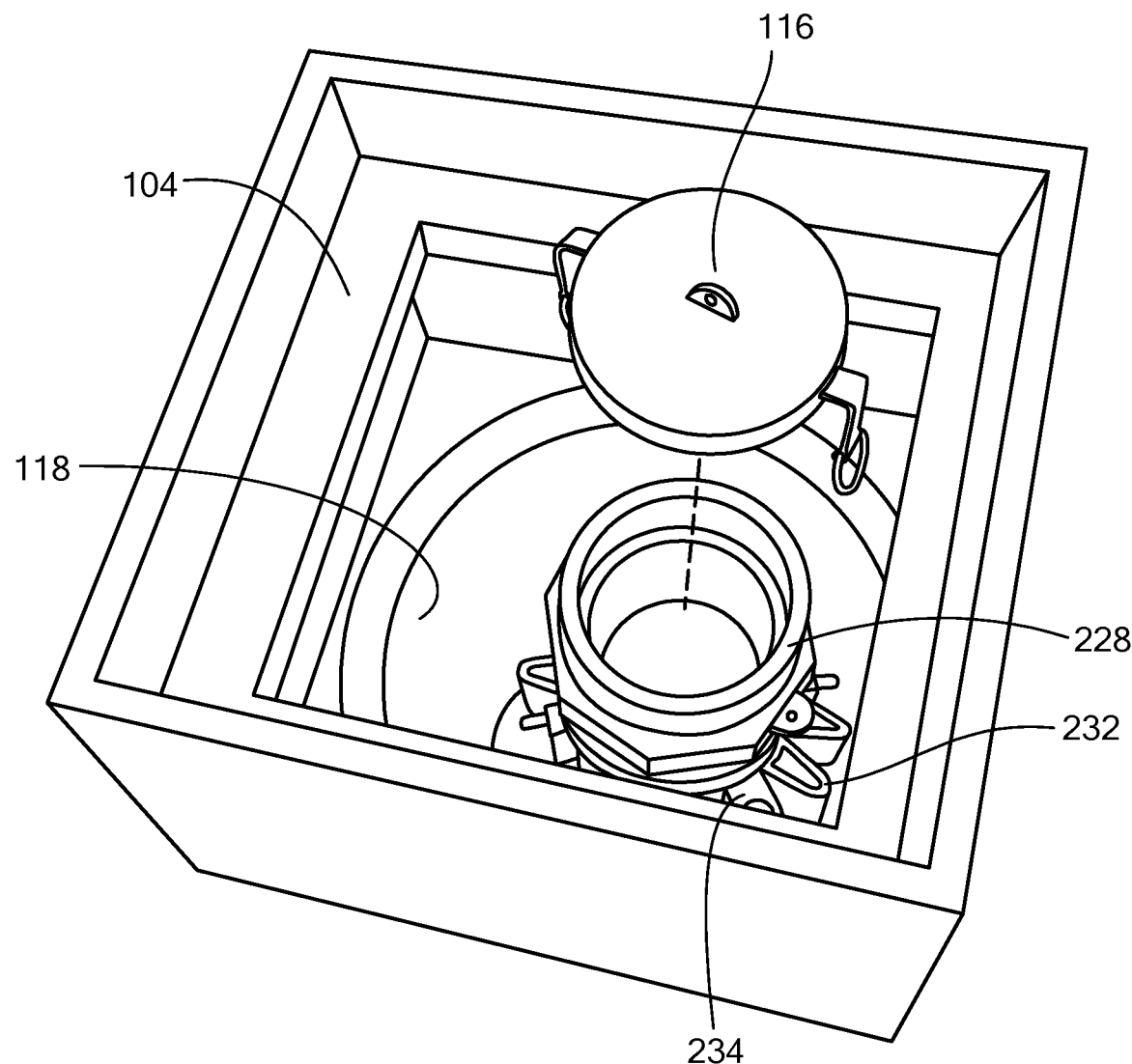
FIG. 4 depicts a rotated isometric view of yet another portion of FIG. 1 in more detail, in accordance with an embodiment.

With reference to FIG. 4, an embodiment includes a lockable cap 116 that is securely disposed on and covers the upper adapter 228. As depicted, the access box 104 (absent its cover 106) is disposed at a street level 108 relative to the underground gas main 102 (see FIG. 1 for example), and the access box 104 is proximate to and is configured to provide access to the lockable cap 116 in addition to providing the aforementioned access to the proximal end 204 of the outer launch tube 200. In an embodiment, the access box 104 has an interior side wall 118 disposed relative to outer portions of the flexible restraint 232 to limit a degree of motion between the flexible restraint 232 and the interior side wall 118 of the access box 104 to defined amount. In an embodiment, the interior side wall 118 of the access box 104 is provided by a cylindrical pipe disposed within the access box 104, but may be provided by any other structure suitable for a purpose disclosed herein.

Figure 5:
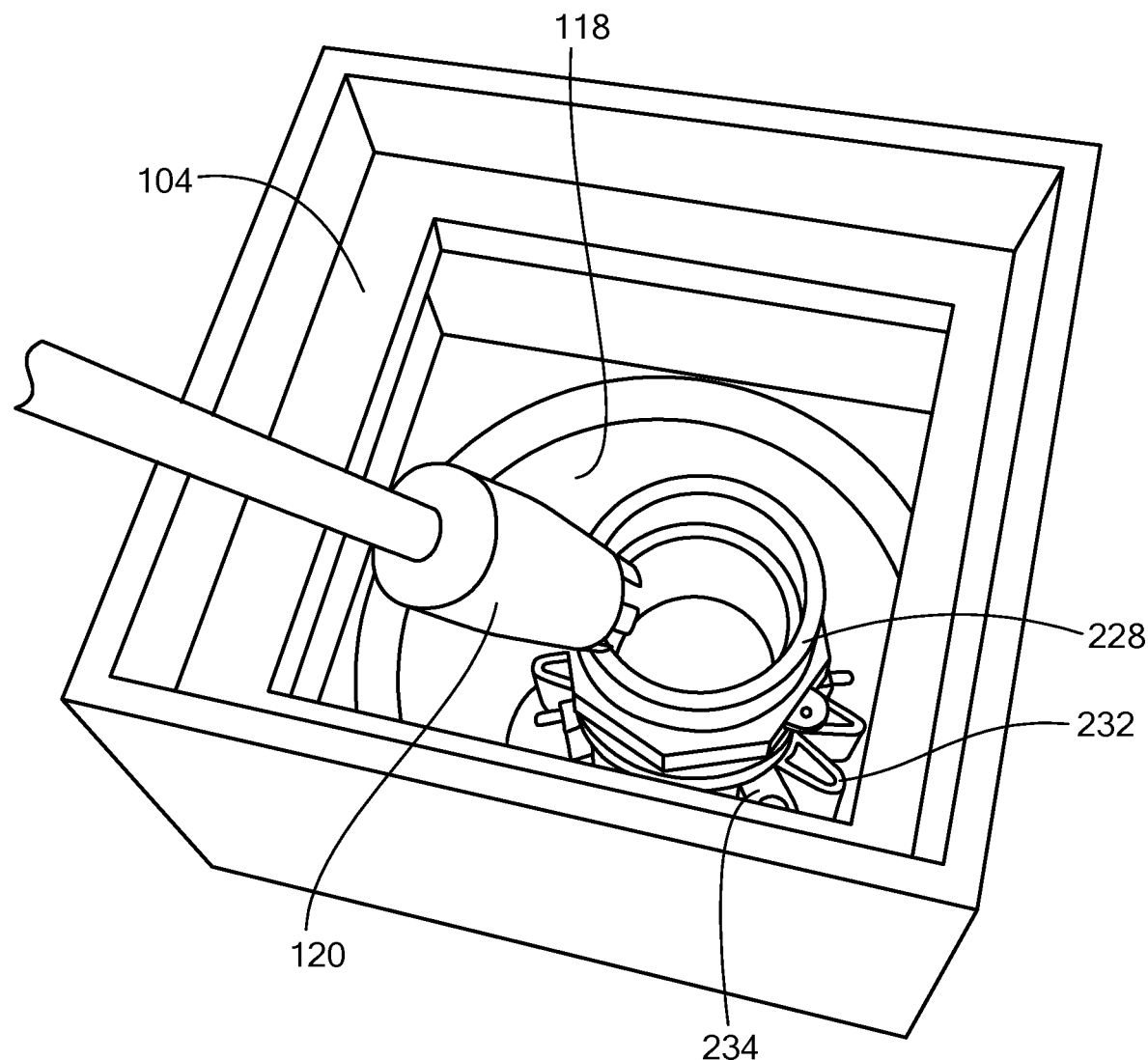
FIG. 5 depicts a rotated isometric view of the portion similar to that of FIG. 4 in a state of use, in accordance with an embodiment.
Figure 6:
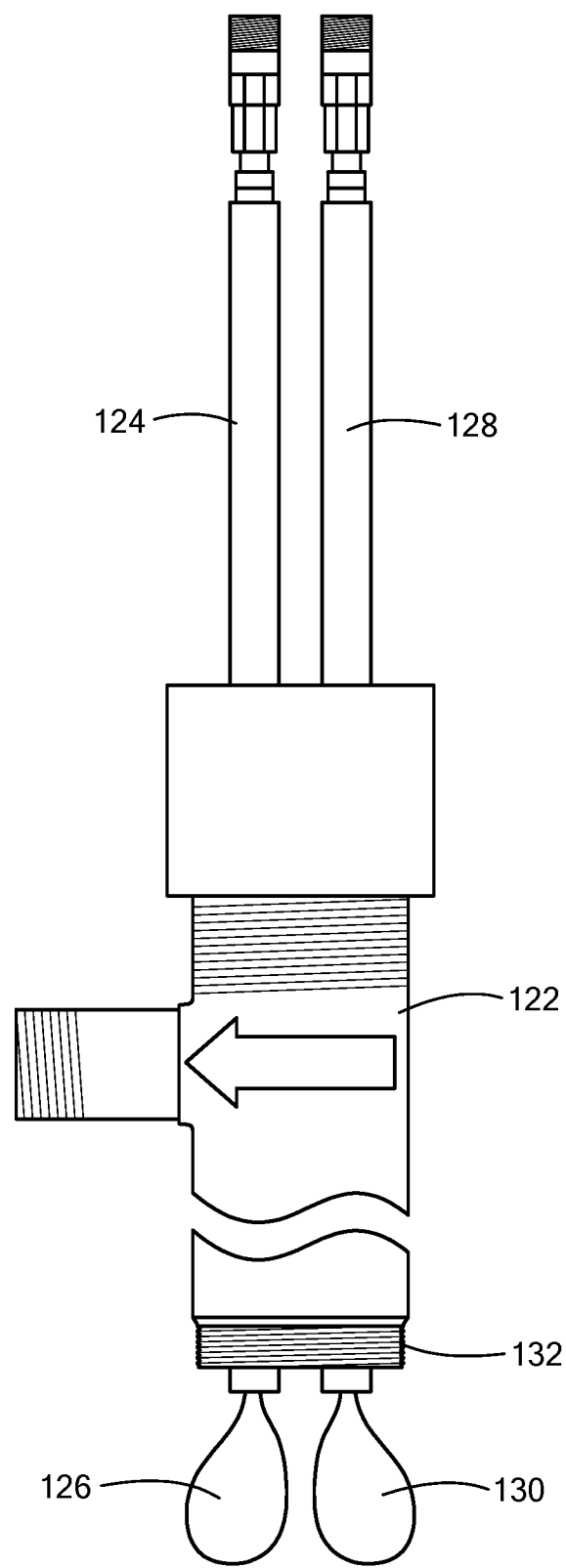
FIG. 6 depicts a segmented side view of portions of an inner launch tube having disposed therein inflation rods and inflatable balloon stoppers, for use in accordance with an embodiment.

With reference to the foregoing description of structure in combination with FIGS. 5-6, a method of using such an in situ launch system 100 will now be described. In a general sense, where the launch system 100 is threaded to the underground gas main 102 via the external threads 218 of the transition fitting 212, and the underground gas main 102 is buried under ground (i.e., not visible or accessible without excavation of the surrounding ground), the method in a general sense involves unthreading and removing the completion plug 222 from the transition fitting 212 and from the outer launch tube 200 absent a need to excavate to reach the underground gas main 102. More specifically, the method involves: removing the cover 106 of the access box 104; removing the lockable cap 116 from the upper adapter 228; inserting a tool 120 into the outer launch tube 200 via the accessible upper adapter 228 (see FIG. 5 for example), and unthreading and removing the completion plug 222 from the transition fitting 212 and from the outer launch tube 200 absent a need to excavate to reach the underground gas main 102. Further more specifically, the method further involves: installing an inner launch tube 122 into the outer launch tube 200 via the accessible upper adapter 228; threading the inner launch tube 122 into the transition fitting 212 via the external threads 132 of the inner launch tube 122 and the internal threads 220 of the transition fitting 212; installing into the inner launch tube 122 a first inflation rod 124 with a deflated first gas expansion bag (alternatively herein referred to as an inflatable balloon stopper) 126 disposed at a distal end thereof, and a second inflation rod 128 with a deflated second gas expansion bag 130 disposed at a distal end thereof (see FIG. 6 for example); orienting the first and second inflation rods 124, 128 to align with the markings 234 that identify the upstream and downstream orientation of the gas main 102; pushing the first and second inflation rods 124, 128 down the inner launch tube 122 until the first and second gas expansion bags 126, 130 are disposed completely within the gas main 102, where one of the gas expansion bags is disposed on the upstream side and the other gas expansion bag is disposed on the downstream side of the gas main 102; and, inflating the first and second gas expansion bags 126, 130 via compressed gas (such as but not limited to compressed air for example) being delivered through the respective first and second inflation rods 124, 128.

In an embodiment involving only one or at least one gas expansion bag, the method may be described generally as involving: installing an inner launch tube 122 into the outer launch tube 200; threading the inner launch tube 122 into the transition fitting 212 via the external threads 132 of the inner launch tube 122 and the internal threads 220 of the transition fitting 212; installing into the inner launch tube 122 at least one inflation rod 124, 128 with a respective deflated gas expansion bag 126, 130 disposed at a distal end thereof; pushing the at least one inflation rod 124, 128 down the inner launch tube 122 until the respective gas expansion bag 126, 130 is disposed within the gas main 102; and inflating the respective gas expansion bag 126, 130 via compressed gas (e.g., compressed air) being delivered through the at least one inflation rod 124, 128.

While details of an embodiment have been described that may involve some degree of gas flow/escape between the time of extracting the completion plug 222 and the time of inflating the gas expansion bags 126, 130 that are disposed within the gas main 102, it will be appreciated that other embodiments are designed for full no-blow operation utilizing the aforementioned slide valve and no-blow stuffing boxes. It is noteworthy that a desirable approach is to prevent gas blow-by, which would entail the use of the aforementioned slide valve and no-blow stuffing box. As such, any and all such combinations of items disclosed herein for a purpose disclose herein are contemplated and considered to fall within the ambit of the appended claims.

While an invention has been described herein with reference to example embodiments, it will be understood by those skilled in the art that various changes may be made and equivalents may be substituted for elements thereof without departing from the scope of the claims. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Additionally, the term "comprising" as used herein does not exclude the possible inclusion of one or more additional features.

The invention claimed is:

1. An in situ launch system for an underground gas main stop-off station,
    the launch system comprising:
    an outer launch tube having a distal lower end and a proximal upper end;
    a transition fitting having a proximal end fitted to the distal end of the outer launch tube with a gas tight seal, and a distal end;
    the distal end of the transition fitting comprising external threads having a first nominal dimension, and internal threads having a second nominal dimension; and
    a completion plug threaded into the internal threads of the transition fitting;
    wherein:
    the outer launch tube comprises a lower portion, an upper portion, and a coupling disposed therebetween;
    the lower portion comprising the distal lower end;
    the upper portion comprising the proximal upper end; and
    the coupling being configured to provide a gas tight seal between the lower and upper portions at the coupling.

2. The launch system of claim 1, further comprising:
    an O-ring disposed between an outer diameter of the completion plug and an inner diameter of the transition fitting proximate the distal end of the outer launch tube.

3. The launch system of claim 1, further comprising:
a compression ring disposed around an outer diameter of the outer launch tube at the distal end of the outer launch tube, the compression ring configured to radially bias the distal end of the outer launch tube against the transition fitting, the outer launch tube and the transition fitting being in press-fit relationship with each other.

4. The launch system of claim 1, wherein:
the outer launch tube is fabricated from a plastic material; and
the transition fitting is fabricated from a metal material.

5. The launch system of claim 1, wherein:
the first nominal dimension of the external threads is 4 inches; and
the second nominal dimension of the internal threads is 3 inches.

6. The launch system of claim 1, wherein:
in a first state, the coupling is not fused to the lower portion or the upper portion; and
in a second state, the coupling is fused to both the lower portion and the upper portion.

7. The launch system of claim 1, further comprising:
an upper adapter fitted to the proximal end of the outer launch tube with a gas tight seal.

8. The launch system of claim 7, further comprising:
a compression ring disposed around an outer diameter of the outer launch tube at the proximal end of the outer launch tube, the compression ring configured to radially bias the proximal end of the outer launch tube against the upper adapter, the outer launch tube and the upper adapter being in press-fit relationship with each other.

9. The launch system of claim 7, further comprising:
a flexible restraint disposed toward the proximal end of the outer launch tube proximate the upper adapter, the flexible restraint being bonded to the outer launch tube and disposed around a substantial circumference of the outer launch tube.

10. The launch system of claim 9, further comprising:
an anti-rotation device securely disposed at the distal end of the outer launch tube proximate the transition fitting, the anti-rotation device having a portion that extends downward with respect to the distal end of the outer launch tube, the downward extending portion being configured to resist rotation of the outer launch tube in an event where the launch system is connected to the gas main and the completion plug is rotatably removed from the transition fitting.

11. The launch system of claim 10, wherein:
the downward extending portion is configured to engage with an outer surface of the gas main.

12. The launch system of claim 9, further comprising:
a lockable cap securely disposed on and covering the upper adapter; and
an access box with a cover disposed at a street level relative to the underground gas main, the access box being proximate to and configured to provide access to the lockable cap;
wherein the access box has an interior side wall disposed relative to outer portions of the flexible restraint to limit a degree of motion between the flexible restraint and the interior side wall of the access box to defined amount.

13. A method of employing the in situ launch system of claim 12, the launch system being threaded to the underground gas main via the external threads of the transition fitting, the method comprising:
removing the cover of the access box;
removing the lockable cap from the upper adapter;
inserting a tool into the outer launch tube, and unthreading and removing the completion plug from the transition fitting and from the outer launch tube absent a need to excavate to reach the underground gas main.

14. The method of claim 13, wherein the proximal upper end of the outer launch tube comprises markings that identify an upstream and a downstream orientation of the underground gas main, the method further comprising:
installing an inner launch tube into the outer launch tube;
threading the inner launch tube into the transition fitting;
installing into the inner launch tube a first inflation rod with a deflated first gas expansion bag disposed at a distal end thereof, and a second inflation rod with a deflated second gas expansion bag disposed at a distal end thereof;
orienting the first and second inflation rods to align with the markings that identify the upstream and downstream orientation of the gas main;
pushing the first and second inflation rods down the inner launch tube until the first and second gas expansion bags are disposed within the gas main, one of the gas expansion bags being disposed on the upstream side and the other gas expansion bag being disposed on the downstream side of the gas main; and
inflating the first and second gas expansion bags via compressed gas being delivered through the respective first and second inflation rods.

15. The launch system of claim 9, wherein:
the flexible restraint comprises markings that identify an upstream and a downstream orientation of the gas main.

16. The launch system of claim 1, wherein:
the proximal upper end of the outer launch tube further comprises markings that identify an upstream and a downstream orientation of the gas main.

17. A method of employing the in situ launch system of claim 1, the launch system being threaded to the underground gas main via the external threads of the transition fitting, the method comprising:
unthreading and removing the completion plug from the transition fitting and from the outer launch tube absent a need to excavate to reach the underground gas main.

18. The method of claim 17, further comprising:
installing an inner launch tube into the outer launch tube;
threading the inner launch tube into the transition fitting;
installing into the inner launch tube at least one inflation rod and a corresponding deflated gas expansion bag disposed at least partially therein or proximate a distal end thereof;
pushing the at least one inflation rod down the inner launch tube until the corresponding gas expansion bag is disposed within the gas main; and
inflating the respective gas expansion bag via compressed gas being delivered through the at least one inflation rod.

19. The method of claim 17, wherein the proximal upper end of the outer launch tube comprises markings that identify an upstream and a downstream orientation of the gas main, the method further comprising:
installing an inner launch tube into the outer launch tube;
threading the inner launch tube into the transition fitting;
installing into the inner launch tube a first inflation rod with a deflated first gas expansion bag disposed at a distal end thereof, and a second inflation rod with a deflated second gas expansion bag disposed at a distal end thereof;

orienting the first and second inflation rods to align with the markings that identify the upstream and downstream orientation of the gas main;

pushing the first and second inflation rods down the inner launch tube until the first and second gas expansion bags are disposed within the gas main, one of the gas expansion bags being disposed on the upstream side and the other gas expansion bag being disposed on the downstream side of the gas main; and inflating the first and second gas expansion bags via compressed gas being delivered through the respective first and second inflation rods.

\* \* \* \* \*